E. C. POOLE.
DRAWING APPLIANCE.
APPLICATION FILED JULY 21, 1920.

1,358,572.

Patented Nov. 9, 1920.
2 SHEETS—SHEET 2.

INVENTOR,
E. C. Poole,
BY
C. J. Siggers.
ATTORNEY.

UNITED STATES PATENT OFFICE.

EDWARD COOPER POOLE, OF SOUTHBOURNE-ON-SEA, ENGLAND.

DRAWING APPLIANCE.

1,358,572.  Specification of Letters Patent.  Patented Nov. 9, 1920.

Application filed July 21, 1920. Serial No. 397,997.

*To all whom it may concern:*

Be it known that I, EDWARD COOPER POOLE, subject of His Majesty the King of England, and resident of Southbourne-on-Sea, in the county of Hants and Kingdom of England, have invented certain new and useful Improvements in or Relating to Drawing Appliances, of which the following is a specification.

This invention refers to improvements in or relating to drawing appliances and it has for its object to provide a simple and attractive device which can be used either as a toy or for purposes of instruction.

In order that the invention may be clearly understood and more readily carried into effect it is hereinafter described with reference to the accompanying drawings, in which:—

Figure 1:
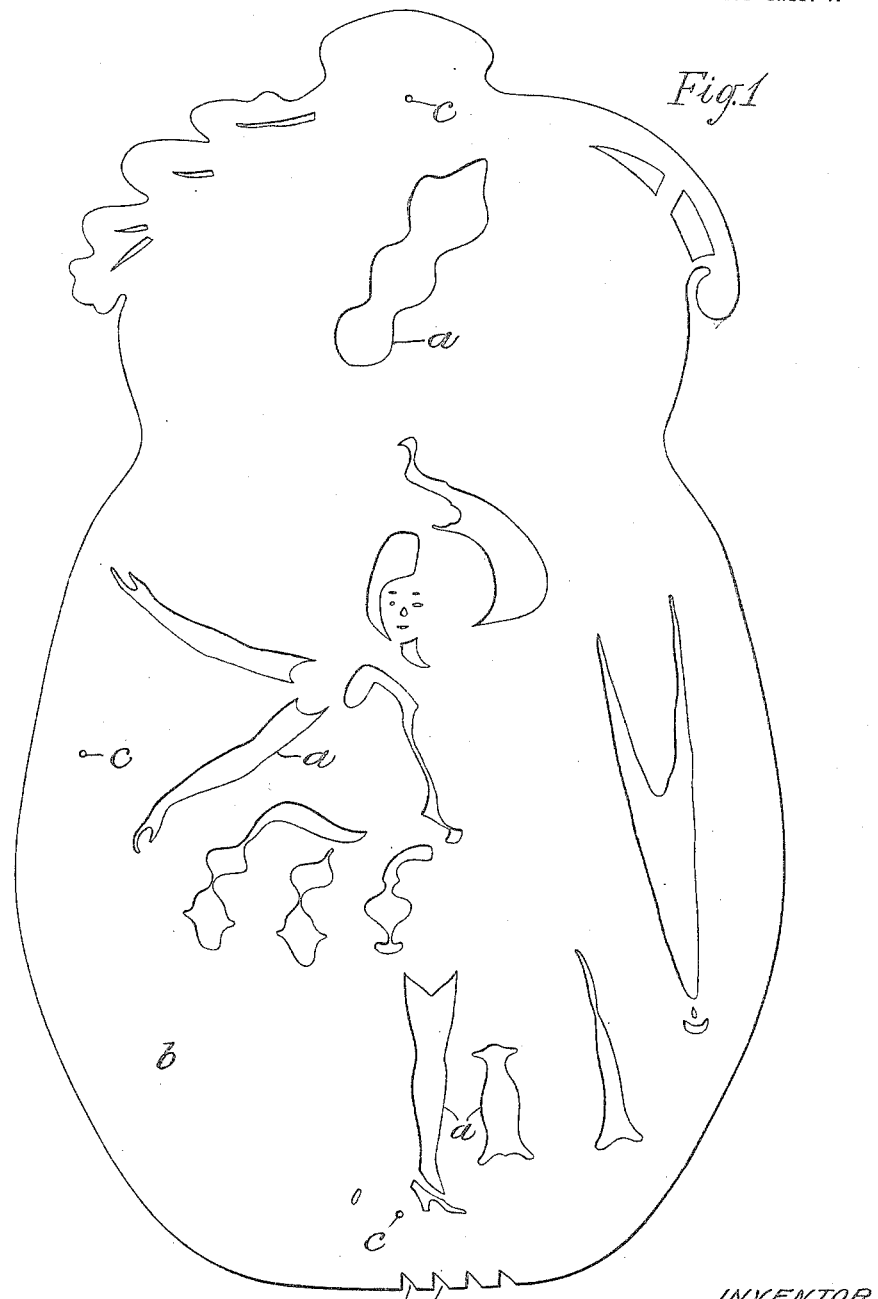
Figure 1 is a plan view of a drawing appliance in accordance with the invention.
Figure 2:
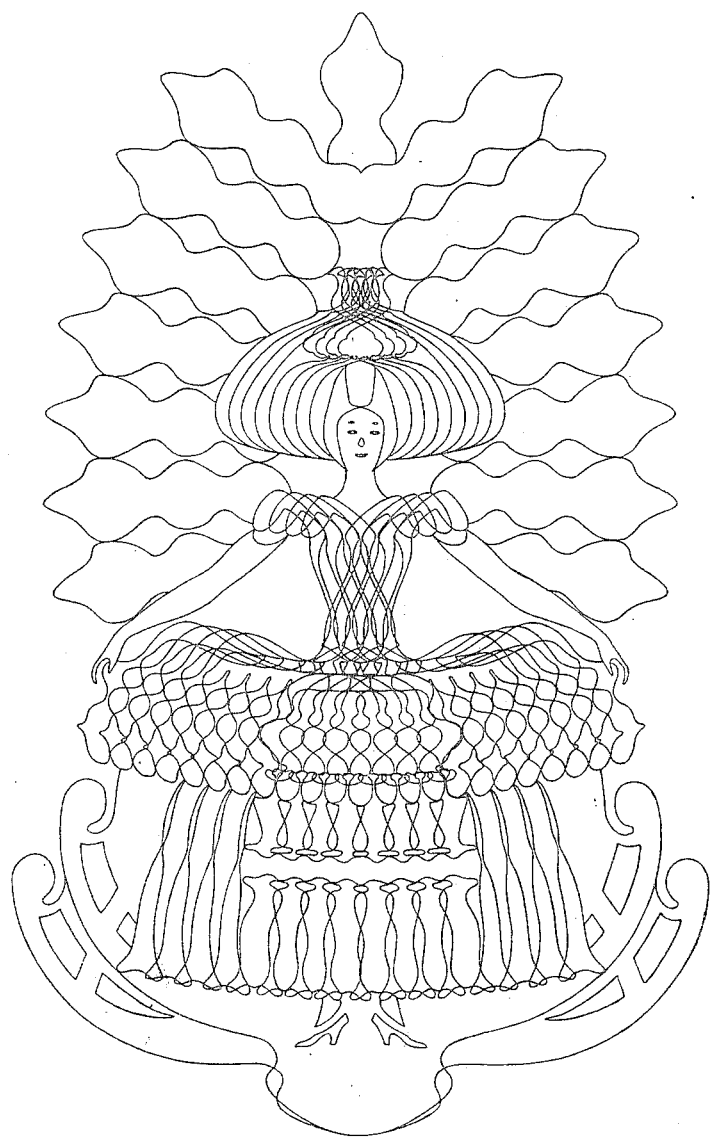
Fig. 2 is a simple representative drawing prepared therefrom and intended to illustrate the purpose of the invention in a simple manner.

As shown and according to this invention a design or designs, such for instance as those shown at $a$ is pierced as a stencil in cardboard, metal, or other suitable material $b$. Center points or pin holes are also formed in the stencil at one or more convenient places as shown by way of example at $c$. In use the appliance or stencil $b$ is placed over the sheet of paper or the like on which the drawing is to be made and held by hand or temporarily secured by placing pins through one or more of the holes $c$ while the design is being traced by pencil or otherwise outlined. If the design is only a half figure as in the present instance, then the appliance is reversed about the middle or top and bottom pin holes and the other half completed in a similar manner. Then by rotating or turning the appliance about one, or more, of the centers $c$ the outline or design, or a portion thereof can be repeated indefinitely thus forming a more or less complicated and elaborate picture or design as is illustrated by way of example in Fig. 2. Notches or other suitable indications such as those shown at $d$ may be provided at one or more points on the stencil to enable the degree of movement or the angle through which the appliance is turned about its various centers to be readily determined or kept constant. It will be obvious that almost infinite variations in design can be produced by suitably manipulating the appliance and omitting some part or parts of the design. The appliances themselves can also be made in unlimited different patterns as desired. Artistic effects can also be produced by coloring or blacking in portions of the design.

The device will be found to be attractive as a toy and useful for educational purposes or in the preparation of designs.

What I claim is:—

A drawing appliance comprising a sheet of relatively stiff material pierced with designs and forming a stencil, said sheet being provided with a plurality of pin holes within which pivotal means may be inserted whereby the sheet may be turned to effect duplication of certain of the designs, and having a plurality of angular notches in the edge of the sheet whereby the amount of turning of the sheet about the pivotal means may be determined.

In testimony whereof I have hereunto signed by my name.

E. COOPER POOLE.